United States Patent
Flick

(10) Patent No.: US 10,180,689 B2
(45) Date of Patent: Jan. 15, 2019

(54) VEHICLE SYSTEM INCLUDING SECURITY UNIT PROVIDING DEGRADATION COMMANDS VIA A VEHICLE DATA BUS AND RELATED METHODS

(71) Applicant: Omega Patents, L.L.C., Douglasville, GA (US)

(72) Inventor: Kenneth E. Flick, Douglasville, GA (US)

(73) Assignee: OMEGA PATENTS, L.L.C., Douglasville, GA (US)

( * ) Notice: Subject to any disclaimer, the term of this patent is extended or adjusted under 35 U.S.C. 154(b) by 84 days.

(21) Appl. No.: 15/241,596

(22) Filed: Aug. 19, 2016

(65) Prior Publication Data

US 2018/0050660 A1 Feb. 22, 2018

(51) Int. Cl.
*B60R 25/20* (2013.01)
*G05D 13/02* (2006.01)
*B60R 25/30* (2013.01)

(52) U.S. Cl.
CPC ............ *G05D 13/02* (2013.01); *B60R 25/30* (2013.01); *B60R 2325/101* (2013.01)

(58) Field of Classification Search
CPC .... B60R 25/20; B60R 2325/101; G05D 13/02
See application file for complete search history.

(56) References Cited

U.S. PATENT DOCUMENTS

| 4,055,772 | A | 10/1977 | Leung |
| 4,383,242 | A | 5/1983 | Sassover et al. |
| 4,538,262 | A | 8/1985 | Sinniger et al. |
| 4,697,092 | A | 9/1987 | Roggendorf et al. |
| 4,760,275 | A | 7/1988 | Sato et al. |
| 4,792,783 | A | 12/1988 | Burgess et al. |
| 5,146,215 | A | 9/1992 | Drori |
| 5,252,966 | A | 10/1993 | Lambropoulos et al. |
| 6,011,460 | A | 1/2000 | Flick |
| 8,032,278 | B2 | 10/2011 | Flick |
| 9,656,631 | B1 | 5/2017 | Flick |
| 2009/0109039 | A1* | 4/2009 | Kellzi .................... B60R 25/04 340/584 |
| 2014/0277838 | A1 | 9/2014 | Flick |

(Continued)

OTHER PUBLICATIONS

Mark Thompson "The Thick and Thin of Car Cabling" by Thompson appearing in the IEEE Spectrum, Feb. 1996, pp. 42-45.

(Continued)

*Primary Examiner* — Alan D Hutchinson

(74) *Attorney, Agent, or Firm* — Allen, Dyer, Doppelt, + Gilchrist, P.A.

(57) ABSTRACT

A vehicle security unit is for a vehicle including at least one data communications bus, an On-Board Diagnostic (OBD) port coupled to the at least one data communications bus, and a vehicle tracking unit to be coupled to the OBD port. The vehicle security unit may include a security unit housing, a short-range security wireless device carried by the security unit housing, and a vehicle security controller carried by the security unit housing and configured to establish a wireless communication link via the short-range security wireless device with the vehicle tracking unit and communicate via the at least one data communications bus responsive to the communication link.

26 Claims, 3 Drawing Sheets

(56) References Cited

U.S. PATENT DOCUMENTS

| | | |
|---|---|---|
| 2015/0246658 A1 | 9/2015 | Flick |
| 2015/0291109 A1 | 10/2015 | Flick |
| 2015/0309949 A1* | 10/2015 | Bettencourt .......... G06F 13/387 |
| | | 710/106 |
| 2017/0101007 A1* | 4/2017 | DeVries ................. A61B 5/082 |
| 2017/0197585 A1* | 7/2017 | Izraeli ................ B60R 25/2009 |
| 2017/0197587 A1 | 7/2017 | Flick |
| 2017/0197588 A1 | 7/2017 | Flick |
| 2017/0309085 A1* | 10/2017 | Elliott .................... G07C 5/008 |

OTHER PUBLICATIONS

"Surface Vehicle Standard, Class B Data Communications Network Interface", SAE J1850, Jul. 1995; pp. 52.

"Surface Vehicle Information Report, Chrysler Sensor and Control (CSC) Bus Multiplexing Network for Class 'A' Applications", SAE J2058, Jul. 1990.; p. 26.

* cited by examiner

VEHICLE SYSTEM INCLUDING SECURITY UNIT PROVIDING DEGRADATION COMMANDS VIA A VEHICLE DATA BUS AND RELATED METHODS

TECHNICAL FIELD

The present invention relates to the field of vehicle control systems and, more particularly, to a remote function control system and related methods for vehicles.

BACKGROUND

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function, U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Unfortunately, many vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to reduce cables to three or four wires and to simplify the exchange of data among the various onboard electronic systems as disclosed, for example, in "The Thick and Thin of Car Cabling" by Thompson appearing in the IEEE Spectrum, February 1996, pp. 42-45.

Implementing multiplexing concepts in vehicles in a cost-effective and reliable manner may not be easy. Successful implementation, for example, may require the development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle control systems, such as aftermarket vehicle security systems, are for hardwired connection to vehicle devices and are not readily adaptable to a vehicle including a data communications bus. Moreover, a vehicle security system if adapted for a communications bus and devices for one particular model, model year, and manufacturer, may not be compatible with any other models, model years, or manufacturers. Other systems for the control of vehicle functions may also suffer from such shortcomings.

One approach to addressing these shortcomings is described in U.S. Pat. No. 6,011,460 to Flick which discloses a multi-vehicle security system. More particularly, the Flick '460 patent discloses a desired signal enabling circuit electrically coupled to the data communications bus for enabling an alarm controller to operate using a set of desired signals for a desired vehicle from among a plurality of possible sets of signals for different vehicles. Thus, the desired signal enabling circuit permits the alarm controller to communicate with a vehicle security sensor and an alarm indicator via the data communications bus so that the alarm controller is capable of operating the alarm indicator responsive to the vehicle security sensor. The desired signal enabling circuit may learn the desired set of signals from the plurality of different sets of signals for different vehicles by connection and communications with a downloading device, such as a portable or laptop computer.

However, still further improvements for remote control device operation of vehicle devices, for example, a security system, remote start system, etc., may be desired. In particular, it may be desirable to more easily configure or adapt a wider range of vehicle devices to be operated from a remote control device.

SUMMARY

A vehicle system may be for a vehicle including at least one data communications bus, and an On-Board Diagnostic (OBD) port coupled to the at least one data communications bus. The vehicle system may include a vehicle tracking unit including a tracker housing, an OBD connector to be removably coupled to the OBD port, a vehicle position determining device carried by the tracker housing, a long-range tracker wireless device carried by the tracker housing, a short-range tracker wireless device carried by the tracker housing and having a shorter operating range than the long-range tracker wireless device, and a tracker controller carried by the tracker housing and coupled to the OBD connector. The tracker controller may be configured to send vehicle position information via the long-range tracker wireless device, and establish a wireless communication link via the short-range tracker wireless device. The system may further include a vehicle security unit including a security unit housing, a short-range security wireless device carried by the security unit housing, and a vehicle security controller carried by the security unit housing and configured to establish the wireless communication link via the short-range security wireless device with the short-range tracker wireless device, and communicate via the at least one data communications bus responsive to the wireless communication link.

More particularly, the vehicle security controller may be configured to communicate a vehicle degradation command to at least one vehicle device via the at least one data communications bus responsive to the wireless communication link. By way of example, the vehicle degradation command may comprise at least one of an engine start blocking command, a vehicle speed slow command, an entertainment system volume change command, a dashboard indicator change command, etc.

In accordance with one example embodiment, the vehicle security controller may be configured to communicate via the at least one data communications bus responsive to the wireless communication link being broken. In accordance with another example embodiment, the vehicle security controller may be configured to communicate via the at least one data communications bus responsive to receiving a tamper signal from the tracker controller via the wireless communication link.

The function controller may be configured to be placed into an override mode responsive to operation of at least one vehicle device. By way of example, the long-range tracker wireless device may comprise a tracker cellular wireless device, and the short-range tracker wireless device may comprise a tracker Bluetooth wireless device. Similarly, the short-range security wireless device may also comprise a Bluetooth wireless device, for example.

In some embodiments, the long-range tracker wireless device, the short-range wireless device, and the tracker controller may be powered via the OBD connector. Furthermore, the system may also include a back-up battery carried by the tracker housing and powered via the OBD connector. By way of example, the at least one data communications bus may comprise a high-speed data bus, and a low-speed data bus having a speed lower than the high-speed data bus. The tracker controller may be coupled to the low-speed data communications bus, and the security controller may be coupled to the high-speed data communications bus, for example.

A related vehicle security unit is also provided, such as the one described briefly above. A vehicle security method is also provided for a vehicle including at least one data communications bus, and an OBD port coupled to the at least one data communications bus. The method may include, at a vehicle tracking unit including a tracker housing, an OBD connector to be removably coupled to the OBD port, a vehicle position determining device carried by the tracker housing, a long-range tracker wireless device carried by the tracker housing, and a short-range tracker wireless device carried by the tracker housing and having a shorter operating range than the long-range tracker wireless device, sending vehicle position information via the long-range tracker wireless device and establishing a wireless communication link via the short-range tracker wireless device. The method may further include, at a vehicle security unit including a security unit housing and a short-range security wireless device carried by the security unit housing, establishing the wireless communication link via the short-range security wireless device with the short-range tracker wireless device and communicating via the at least one data communications bus responsive to the wireless communication link.

DETAILED DESCRIPTION

This disclosure is provided with reference to the accompanying drawings, in which various example embodiments are shown. However, other embodiments and different forms may be used, and the disclosure should not be construed as limited to the example embodiments set forth herein. Rather, these example embodiments are provided so that this disclosure will be thorough and complete. Like numbers refer to like elements throughout.

Figure 1:
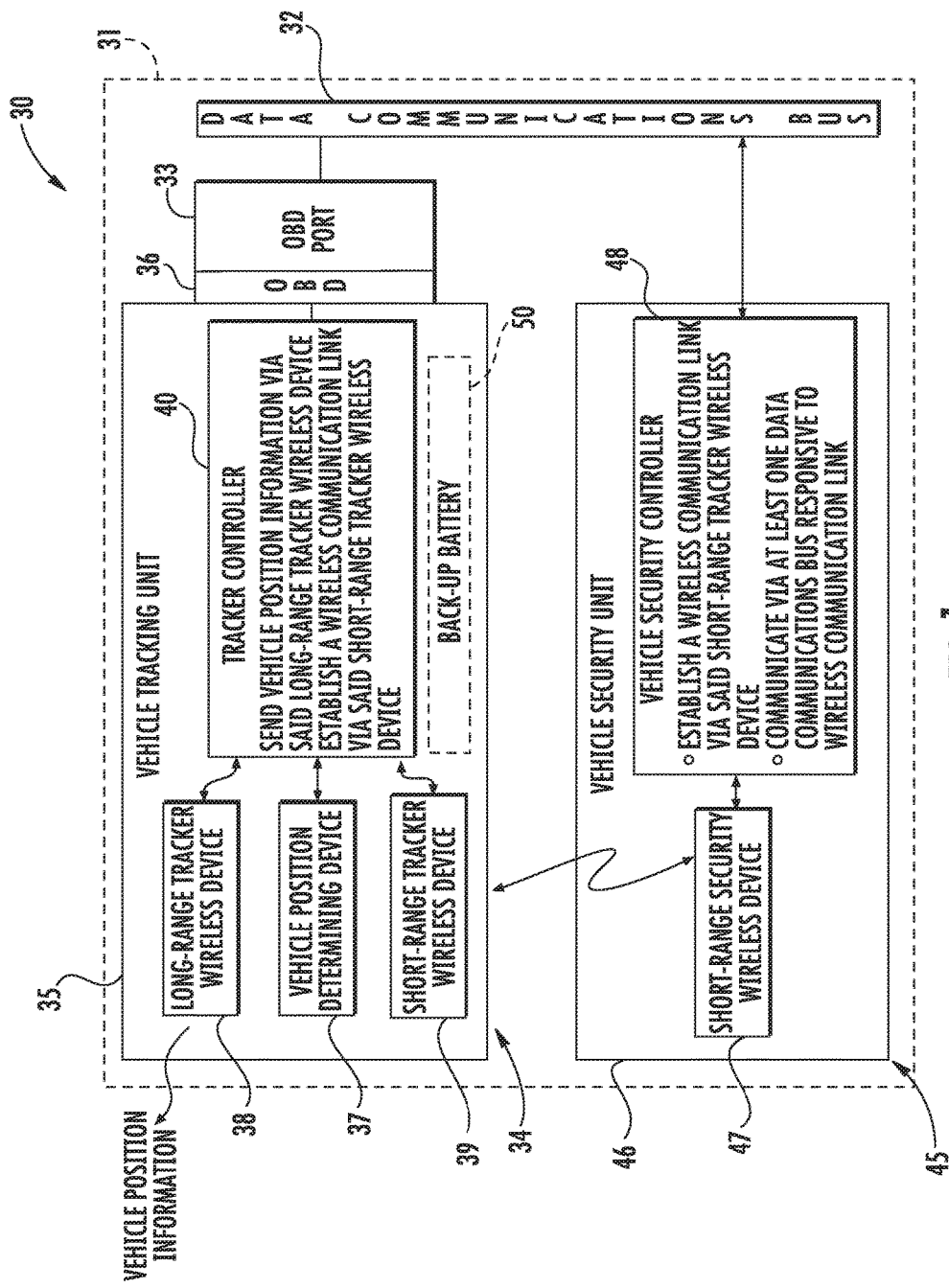
FIG. 1 is a schematic block diagram of a vehicle system in accordance with an example embodiment.

Referring initially to FIG. 1, a vehicle system 30 is for a vehicle 31 illustratively including one or more data communications busses 32, and an On-Board Diagnostic (OBD) port 33 coupled to the data communications bus. The vehicle system 30 illustratively includes a vehicle tracking unit 34 including a tracker housing 35, an OBD connector 36 to be removably coupled to the OBD port, and a vehicle position determining device 37 carried by the tracker housing. The OBD connector 36 may be directly carried by the tracker housing 30, or coupled by a pigtail cable, as will be appreciated by those skilled in the art. By way of example, the vehicle position determining device may include a GPS receiver, although other position determining devices may also be used.

The vehicle system 30 further illustratively includes a long-range tracker wireless device 38 carried by the tracker housing 35, and a short-range tracker wireless device 39 carried by the tracker housing and having a shorter operating range than the long-range tracker wireless device. By way of example, the long-range tracker wireless device 38 may be a cellular device. In accordance with another example implementation, the long-range tracker wireless device 38 may be a wireless local area network (WLAN) device which communicates with a WLAN access point when in range thereof (e.g., when the vehicle 31 is at a home location). The short-range tracker wireless device 39 may be a Bluetooth® device (i.e., using short-wavelength UHF radio waves in the ISM band from 2.4 to 2.485 GHz), although WLAN or other suitable short-range communications formats may also be used in different embodiments. For example, the short-range tracker wireless device 39 may be used to communicate vehicle diagnostic information to the vehicle owner's cellphone.

The vehicle tracking unit 34 further illustratively includes a tracker controller 40 carried by the tracker housing 35 and coupled to the OBD connector 36. By way of example, the tracker controller 40 may be implemented using hardware (e.g., a microprocessor) and associated non-transitory computer-readable medium having computer-executable instructions for causing the hardware to perform the various operations described herein. More particularly, the tracker controller 40 may be configured to send vehicle position information via the long-range tracker wireless device to a user or monitoring system, for example. By way of example, this information may be sent to parents, insurance companies, and corporations to monitor children, insurance policy holders, and employees, respectively. That is, such information may be used to determine the places the vehicle 31 travels to, as well as the speed at which it travels, and speed exceeded notifications. In some embodiments, additional information may also be communicated via the long-range tracker wireless device 38, such as vehicle diagnostic or health information, for example.

The system 30 further illustratively includes a vehicle security unit 45 including a security unit housing 46, a short-range security wireless device 47 carried by the security unit housing, and a vehicle security controller 48 carried by the security unit housing. The short-range security wireless device 47 may operate using the same communications format as the short-range tracker wireless device 39 (e.g., Bluetooth® format, etc.).

Figure 3:
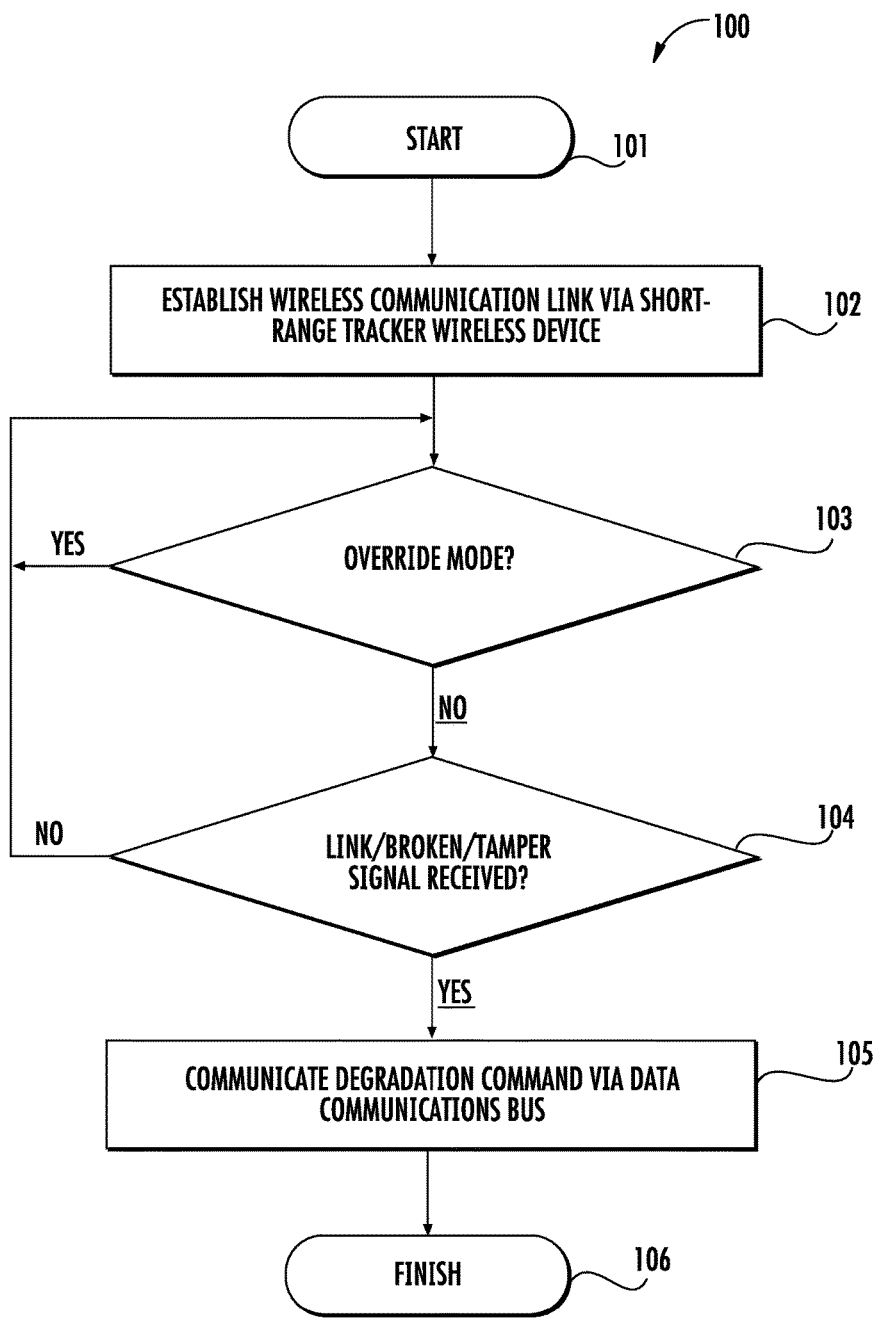
FIG. 3 is a flow diagram illustrating method aspects associated with the system of FIG. 1.

Operation of the system 30 and vehicle security unit 45 is now described further with reference to the flow diagram 100 of FIG. 3. Beginning at Block 101, the tracker controller 40 and vehicle security controller 48 may establish a wireless communication link (e.g., a Bluetooth® link) via the short-range tracker wireless device 39 and the short-range security wireless device 47, at Block 102. More particularly, the wireless communication link is used to convey to the vehicle security unit 45 that the vehicle tracking unit is still installed in the vehicle 31 and functioning properly, which the vehicle security controller 48 monitors when in a normal (e.g., armed) operating mode. However, it should be noted that the vehicle security controller 48 may optionally be placed in an override (disarmed) mode (Block 103), e.g., by the owner of the vehicle 31 when he or she is in the vehicle. This may be done in various ways, such as by operation of a vehicle device. For example, a local input device may be within the vehicle, such as a keypad, touch screen, etc., to cause the vehicle security controller 48 to enter the override mode. Another approach is by interfacing with a mobile wireless communications device, such as a user's smart phone, via the short-range security wireless device 47 to switch between the override and normal modes, for example.

One approach by which the wireless communication link may be used to inform the vehicle security unit 45 that the vehicle tracking unit is still installed in the vehicle 31 and functioning properly is based upon the wireless communication link not being broken (Block 104). That is, the vehicle security unit 45 will know that the vehicle tracking unit 34 is plugged into the OBD port 33 and functioning properly so long as the wireless communication link is established. More specifically, if the wireless communication link is broken, this may indicate that the vehicle tracking unit 34 has been unplugged from the OBD port 33 and is accordingly no longer receiving power from the OBD port. For the Bluetooth® example, as long as the devices remain paired, the security controller 48 will be able to determine the tracking unit 34 is still in the vehicle and operational. For example, this might be the case if a child, employee, or thief unplugs the vehicle tracking unit 34 from the OBD port 33 to hide the location of the vehicle 31 or the speed at which it is traveling.

In some embodiments, the vehicle tracking unit 34 may optionally include a back up battery 50 to provide power to the tracker controller 40, long and short-range tracker wireless devices 38, 39, and the vehicle position determining device 37 if power from the OBD port is lost, such as if the vehicle tracking unit is unplugged from the OBD port. In this case, the short-range tracker wireless device may still maintain the wireless communication link with the short-range security device 47 based upon back-up power, but the vehicle security unit 45 may still need to take appropriate action based upon the security event which has occurred (e.g., unplugging of the vehicle tracking unit 34 from the OBD port 33). As such, the tracker controller 40 may advantageously send a tamper signal to the vehicle security controller 48 via the wireless communication link, indicating that a security event has occurred with the vehicle tracking unit 34 (e.g., it has been unplugged). In some embodiments, the vehicle security controller 48 may look to either a broken wireless communication link or a tamper signal as an indicator that a security event has occurred with the vehicle tracking unit 34 which requires communicating over the data communications bus 32 to control one or more vehicle operations in response to the security event (Block 105). The method of FIG. 3 illustratively concludes at Block 106.

A related vehicle security method may include, at the vehicle tracking unit 34, sending vehicle position information via the long-range tracker wireless device 38 and establishing a wireless communication link via the short-range tracker wireless device 39, as noted above. The method may further include, at the vehicle security unit 45 establishing the wireless communication link via the short-range security wireless device 47 with the short-range tracker wireless device 39 and communicating via the at least one data communications bus 32 responsive to the wireless communication link, as also noted above.

Figure 2:
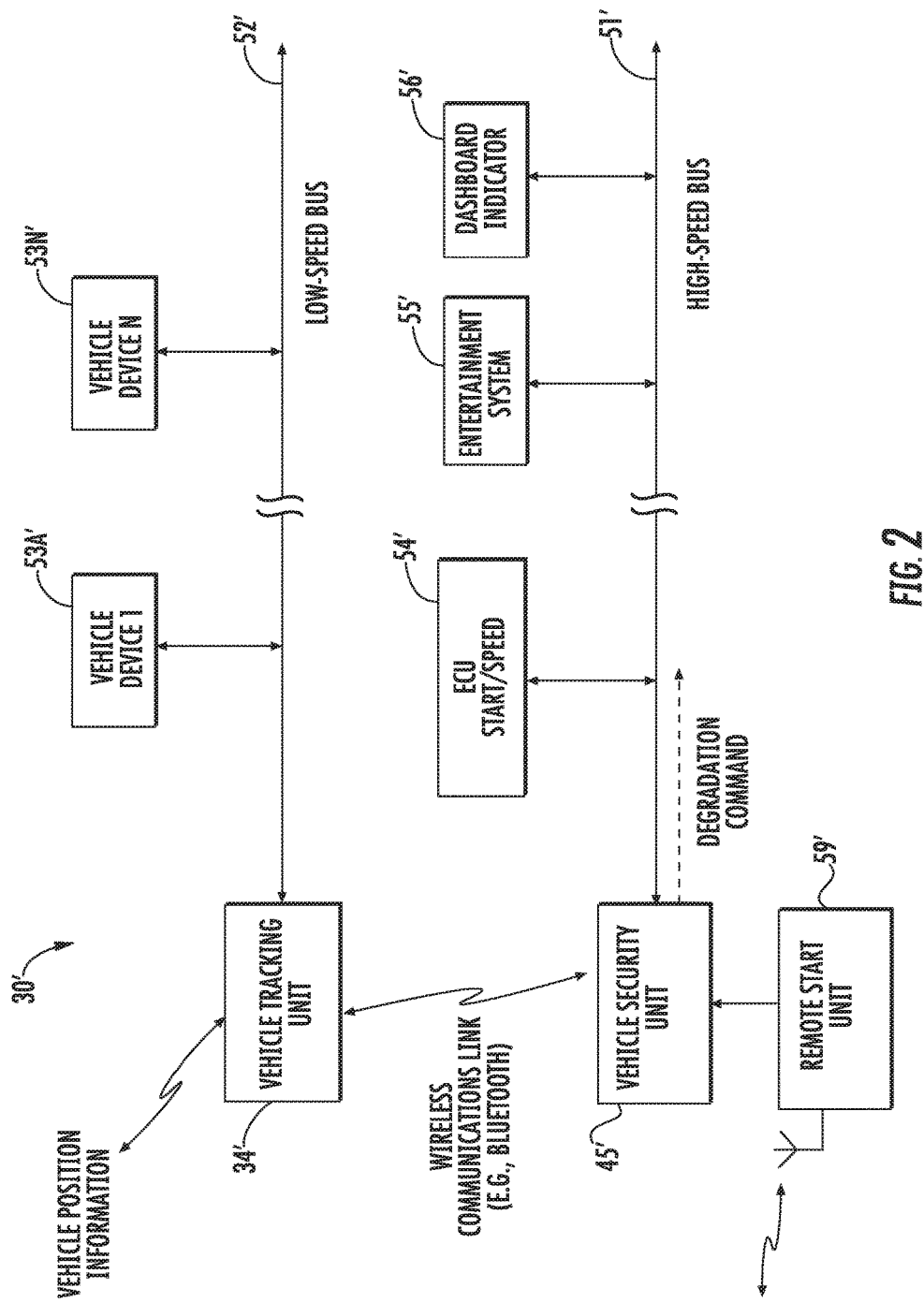
FIG. 2 is a schematic block diagram of an example implementation of the vehicle system of FIG. 1.

Turning additionally to FIG. 2, an example implementation of another embodiment of the system 30' is now described in which the vehicle includes multiple data busses, in particular a high-speed data bus 51' and a low-speed data bus 52' having a speed lower than the high-speed data bus.

In the illustrated example, the vehicle tracking unit 34' is coupled to the low-speed data communications bus 52', and the vehicle security unit 45' is coupled to the high-speed data communications bus 51'. By way of example, the different types of data busses may include Controller Area Network (CAN) busses, Local Interconnect Network (LIN) busses, etc.

Furthermore, the slow-speed and high-speed data busses 51', 52' are each coupled to a plurality of respective vehicle devices. In the illustrated example, the low-speed bus 52' is connected to a plurality of vehicle devices 53a'-53n', while the high-speed data bus is connected to the vehicle's electronic control unit (ECU) 54', an entertainment/media system 55', and a dashboard indicator 56'. More particularly, responsive to determining a security event with the vehicle tracking unit as noted above, the vehicle security controller 48' may be configured to communicate a vehicle degradation command to one or more of these devices via the high-speed bus 51'. In accordance with one example, the vehicle degradation command may be in the form of an engine start blocking command and/or a vehicle speed slow command to the ECU 54', causing the ECU to prevent starting of the vehicle or to govern the speed to a desired limit, for example. The vehicle security unit 45' may be optionally coupled to a remote start unit 59', and have multi-vehicle capability so that the remote start unit can interface with different vehicles, as disclosed in U.S. Pat. Nos. 6,011,460 and 8,032,278, for example, the entire contents of which are hereby incorporated herein by reference. Of course, remote start capability could also be included within the vehicle security unit 45' as well.

In accordance with another example embodiment, the vehicle degradation command may take the form of an entertainment system volume change command to the entertainment system 55', causing it to reduce or shut off the volume of a stereo, etc. Still another vehicle degradation command may take the form of a dashboard indicator change command to the dashboard indicator 56', such as to cause a warning indication (e.g., flashing light or image, warning message, etc.) via a heads-up display, navigation screen, or dashboard light(s), for example. Of course, other devices may also be coupled to the high-speed bus 51' (e.g., Transmission Control Unit (TCU), Antilock Braking System (ABS), body control module (BCM), etc.) and vehicle degradation commands similarly sent thereto in different embodiments. Moreover, multiple vehicle degradation commands may be sent to different devices responsive to the same security event (e.g., the vehicle 31 may be slowed and the dashboard lights flashed at the same time).

Many modifications and other embodiments will come to the mind of one skilled in the art having the benefit of the teachings presented in the foregoing descriptions and the associated drawings. Therefore, it is understood that the disclosure is not to be limited to the specific embodiments set forth above, and that modifications and embodiments are intended to be included within the scope of the appended claims.

That which is claimed is:

1. A vehicle system for a vehicle comprising a first data communications bus and a second data communications bus different than the first data communications bus, and an On-Board Diagnostic (OBD) port coupled to the first data communications bus, the vehicle system comprising:
    a vehicle tracking unit comprising
        a tracker housing,
        an OBD connector to be removably coupled to the OBD port,
        a vehicle position determining device carried by said tracker housing,
        a long-range tracker wireless device carried by said tracker housing,
        a short-range tracker wireless device carried by said tracker housing and having a shorter operating range than said long-range tracker wireless device, and
        a tracker controller carried by said tracker housing and coupled to said OBD connector, said tracker controller configured to send vehicle position information via said long-range tracker wireless device, and establish a wireless communication link via said short-range tracker wireless device; and
    a vehicle security unit comprising
        a security unit housing,
        a short-range security wireless device carried by said security unit housing, and
        a vehicle security controller carried by said security unit housing and configured to establish the wireless communication link via said short-range security wireless device with said short-range tracker wireless device, and communicate via the second data communications bus responsive to the wireless communication link.

2. The vehicle system of claim 1 wherein said vehicle security controller is configured to communicate a vehicle degradation command to at least one vehicle device via the second data communications bus responsive to the wireless communication link.

3. The vehicle system of claim 2 wherein the vehicle degradation command comprises at least one of an engine start blocking command, and a vehicle speed slow command.

4. The vehicle system of claim 2 wherein the vehicle degradation command comprises at least one of an entertainment system volume change, and a dashboard indicator change.

5. The vehicle system of claim 1 wherein said vehicle security controller is configured to communicate via the at second data communications bus responsive to the wireless communication link being broken.

6. The vehicle system of claim 1 wherein said vehicle security controller is configured to communicate via the second data communications bus responsive to receiving a tamper signal from the tracker controller via the wireless communication link.

7. The vehicle system of claim 1 wherein said vehicle security controller is configured to be placed into an override mode responsive to operation of at least one vehicle device.

8. The vehicle system of claim 1 wherein said long-range tracker wireless device comprises a tracker cellular wireless device.

9. The vehicle system of claim 1 wherein said short-range tracker wireless device comprises a tracker Bluetooth wireless device.

10. The vehicle system of claim 1 wherein said short-range security wireless device comprises a security Bluetooth wireless device.

11. The vehicle system of claim 1 wherein said long-range tracker wireless device, said short-range wireless device, and said tracker controller are powered via said OBD connector.

12. The vehicle system of claim 11 further comprising a back-up battery carried by said tracker housing and powered via said OBD connector.

13. The vehicle system of claim 1 wherein the second data communications bus comprises a high-speed data bus, and the first data communications bus comprises a low-speed data bus having a speed lower than the high-speed data bus; and wherein said tracker controller is coupled to the low-speed data communications bus, and said security controller is coupled to the high-speed data communications bus.

14. A vehicle security unit for a vehicle comprising a first data communications bus and a second data communications bus different than the first data communications bus, an On-Board Diagnostic (OBD) port coupled to the first data communications bus, and a vehicle tracking unit coupled to the OBD port, the vehicle security unit comprising:
- a security unit housing;
- a short-range security wireless device carried by said security unit housing; and
- a vehicle security controller carried by said security unit housing and configured to establish a wireless communication link via said short-range security wireless device with said vehicle tracking unit, and communicate via the second data communications bus responsive to the wireless communication link.

15. The vehicle security unit of claim 14 wherein said vehicle security controller is configured to communicate a vehicle degradation command to at least one vehicle device via the second data communications bus responsive to the wireless communication link.

16. The vehicle security unit of claim 15 wherein the vehicle degradation command comprises at least one of an engine start blocking command, and a vehicle speed slow command.

17. The vehicle security unit of claim 14 wherein said vehicle security controller is configured to communicate via the second data communications bus responsive to the wireless communication link being broken.

18. The vehicle security unit of claim 14 wherein said vehicle security controller is configured to communicate via the second data communications bus responsive to receiving a tamper signal from the vehicle tracking unit via the wireless communication link.

19. The vehicle security unit of claim 14 wherein said vehicle security controller is configured to be placed into an override mode responsive to operation of at least one vehicle device.

20. The vehicle security unit of claim 14 wherein said short-range security wireless device comprises a Bluetooth wireless device.

21. A vehicle security method for a vehicle comprising a first data communications bus and a second data communications bus different than the first data communications bus, and an On-Board Diagnostic (OBD) port coupled to the first data communications bus, the method comprising:
- at a vehicle tracking unit comprising a tracker housing, an OBD connector to be removably coupled to the OBD port, a vehicle position determining device carried by the tracker housing, a long-range tracker wireless device carried by the tracker housing, and a short-range tracker wireless device carried by the tracker housing and having a shorter operating range than the long-range tracker wireless device, sending vehicle position information via the long-range tracker wireless device and establishing a wireless communication link via the short-range tracker wireless device; and
- at a vehicle security unit comprising a security unit housing and a short-range security wireless device carried by the security unit housing, establishing the wireless communication link via the short-range security wireless device with the short-range tracker wireless device and communicating via the second data communications bus responsive to the wireless communication link.

22. The method of claim 21 wherein communicating via the second data communications bus comprises communicating a vehicle degradation command to at least one vehicle device via the second data communications bus responsive to the wireless communication link.

23. The method of claim 22 wherein the vehicle degradation command comprises at least one of an engine start blocking command, and a vehicle speed slow command.

24. The method of claim 21 wherein communicating via the second data communications bus comprises communicating via the second data communications bus responsive to the wireless communication link being broken.

25. The method of claim 21 further comprising, at the vehicle tracking unit, generating a tamper signal and sending the tamper signal to the vehicle security unit via the wireless communication link; and wherein communicating via the second data communications bus comprises communicating via the second data communications bus responsive to receiving the tamper signal via the wireless communication link.

26. The method of claim 21 further comprising, at the vehicle security unit, entering into an override mode responsive to operation of at least one vehicle device.

* * * * *

UNITED STATES PATENT AND TRADEMARK OFFICE
CERTIFICATE OF CORRECTION

PATENT NO. : 10,180,689 B2
APPLICATION NO. : 15/241596
DATED : January 15, 2019
INVENTOR(S) : Kenneth E. Flick Page 1 of 1

It is certified that error appears in the above-identified patent and that said Letters Patent is hereby corrected as shown below:

In the Claims

Column 8, Line 39,    Delete: "at"
Claim 5

Signed and Sealed this
Twenty-sixth Day of February, 2019

Andrei Iancu
*Director of the United States Patent and Trademark Office*